United States Patent
Harms et al.

(10) Patent No.: US 7,076,854 B2
(45) Date of Patent: Jul. 18, 2006

(54) METHOD FOR THE PRODUCTION OF A SHAFT-HUB CONNECTION

(75) Inventors: Torsten Harms, Hamburg (DE); Juergen Knuedel, Rosengarten (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/275,397

(22) PCT Filed: May 3, 2001

(86) PCT No.: PCT/EP01/04952

§ 371 (c)(1),
(2), (4) Date: Jun. 27, 2003

(87) PCT Pub. No.: WO01/86161

PCT Pub. Date: Nov. 15, 2001

(65) Prior Publication Data

US 2004/0034981 A1    Feb. 26, 2004

(30) Foreign Application Priority Data

May 5, 2000    (DE) .............................. 100 21 901

(51) Int. Cl.
*B21D 39/00*    (2006.01)
(52) U.S. Cl. ............ 29/507; 29/421.1; 29/893.2; 29/893.3; 29/522.1; 29/523; 74/414; 285/382.4
(58) Field of Classification Search ........... 29/421.1, 29/893.2, 893.3, 507, 522.1, 523; 74/54, 74/56, 61, 414; 285/382.4
See application file for complete search history.

(56) References Cited

U.S. PATENT DOCUMENTS

| | | | | |
|---|---|---|---|---|
| 3,577,795 A | * | 5/1971 | Bennett | 74/466 |
| 4,781,076 A | | 11/1988 | Hartnett et al. | |
| 5,101,554 A | * | 4/1992 | Breuer et al. | 29/888.1 |
| 5,259,268 A | * | 11/1993 | Ebbinghaus et al. | 74/567 |
| 5,447,385 A | | 9/1995 | Swars | |
| 6,543,266 B1 | * | 4/2003 | Jaekel | 72/61 |

FOREIGN PATENT DOCUMENTS

| | | |
|---|---|---|
| DE | 849942 | 11/1952 |
| DE | 4112366 | 7/1992 |
| DE | 4302726 A1 | 8/1993 |

(Continued)

OTHER PUBLICATIONS

Translation of JP 08158817, http://www4.ipdl.jpo.go.jp/cgi-bin/tran_web_cgi_ejje.*

(Continued)

*Primary Examiner*—Marc Jimenez
*Assistant Examiner*—Sarang Afzali
(74) *Attorney, Agent, or Firm*—Crowell & Moring LLP

(57) ABSTRACT

A toothed or splined shaft having an external toothing is pushed with clearance into an internal toothing of a hub, tooth to space, and the external toothing of the shaft is pressed together with the internal toothing of the hub. In the push-in position of the shaft, the latter is deformed plastically out of a cavity of the shaft in a radial circumferential widening operation and, so as to provide freedom from clearance between the spaces of the external toothing of the shaft and the internal toothing of the hub, the internal toothing engaging into the external toothing is pressed against the hub in such a way that the hub is deformed elastically and a press fit between the shaft and the hub is produced.

12 Claims, 2 Drawing Sheets

FOREIGN PATENT DOCUMENTS

| | | |
|---|---|---|
| DE | 4107222 C2 | 12/1994 |
| JP | 63224823 A * | 9/1988 .................. 29/507 |
| JP | 5-215138 | 8/1993 |
| JP | 6-341304 | 12/1994 |
| JP | 06-0344044 | 12/1994 |
| JP | 08-158817 | 6/1996 |
| JP | 08-210110 | 8/1996 |
| JP | 2000-326028 | 11/2000 |

OTHER PUBLICATIONS

Copy of Japanese office action.
Copy of letter dated Dec. 15, 2004, providing comments on Japanese office action.
Abridgment of Japanese unexamined publication 8-158817.
Abridgement of Japanese unexamined publication 8-210110.
Copy of Japanese Office Action.
Copy of letter dated Apr. 26, 2005, providing comments on Japanese Office Action.
Abridgement of Japanese unexamined publication No. 06-0344044.
Abridgement of Japanese unexamined publication No. 2000-326028.
Vallory H. Laughner et al., Handbook of Fastening and Joining of Metal Parts, McGraw-Hill Book Company, Inc., 1956 1st Edition, pp. 394-396, 399-401, 530, 531.

* cited by examiner

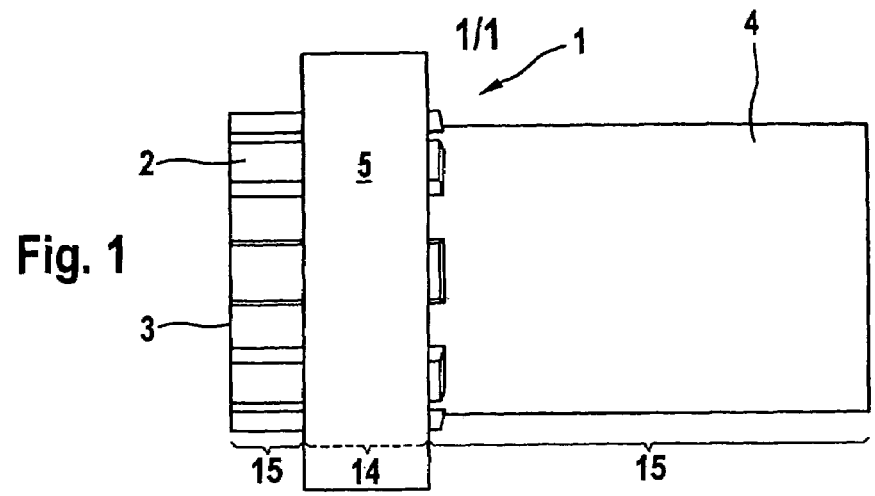
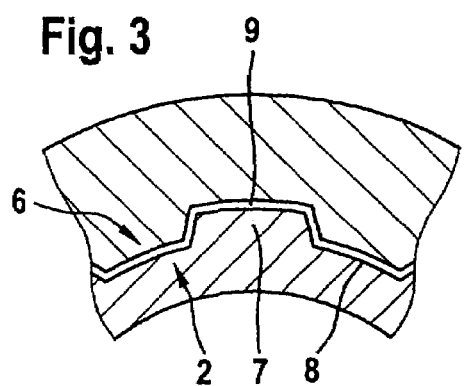
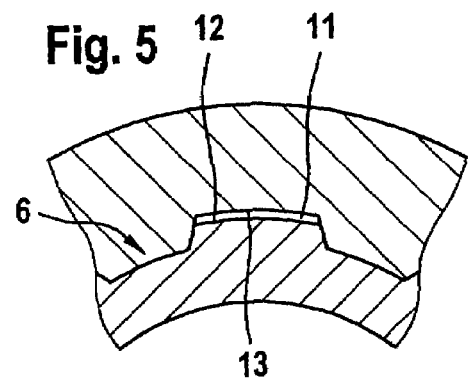
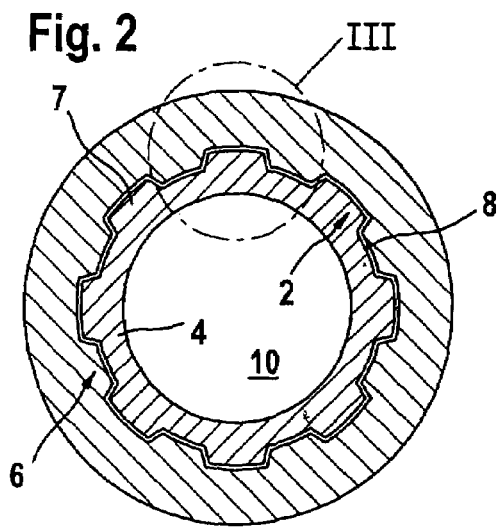
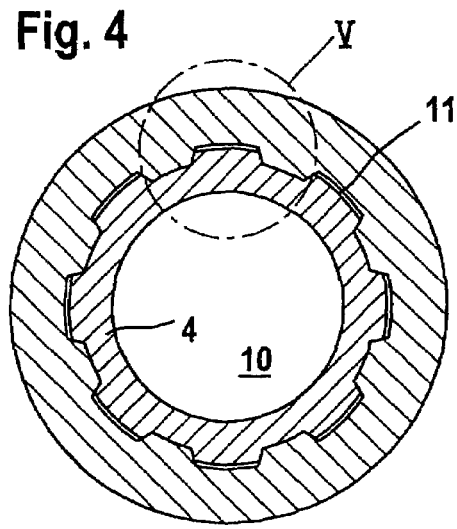

METHOD FOR THE PRODUCTION OF A SHAFT-HUB CONNECTION

BACKGROND AND SUMMARY OF THE INVENTION

This invention relates to a method for making a shaft/hub connection.

A generic method is known from German publication DE 43 02 726 A1. In this case, in a first step to make the assembled connection, the hub and the shaft are designed in such a way that the internal toothing of the hub and the external toothing of the shaft are coordinated with one another in terms of their dimensions, so that, when the shaft is pushed into the hub, a clearance fit is obtained between the two hub/shaft assembled parts. However, before the shaft is pushed into the hub, the internal toothing of the wheel hub is upset on an end-face portion, so that the tooth spaces of the internal toothing on this portion have a smaller width in relation to the remaining part of the hub. The shaft is then slipped into the hub portion having the original space width and is subsequently pressed through the hub portion provided with the smaller space width. In this case, the internal toothing of the portion having the smaller space width and also the external toothing are subjected to very high mechanical stress, with the result that damage to the toothings when the shaft is being pressed through may occur, this being, in particular, against the background of the inclusion of the manufacturing tolerances of the individual parts (shaft, hub). In order to keep the tolerances within narrow limits and thus counteract the risk of the damage referred to, a very high outlay in terms of the manufacture of the individual parts is necessary. Furthermore, the abovementioned upsetting, on the one hand, is an additional work step, thus increasing the cycle time during the making of the connection, and, on the other hand, can be reproduced only with difficulty and requires highly accurate and therefore complicated process management. Moreover, the problem of axial tolerances of the shaft has a major bearing, since, after the shaft has been pressed through the hub, positioning on the latter to achieve the desired exact relative position of the shaft in relation to the hub is virtually impossible to correct.

One object on which the invention is based is to develop a generic method to the effect that it becomes possible in a simple reproducible way to make a shaft/hub connection which optimally satisfies the requirements of dynamic loads.

This object is achieved according to the invention.

By virtue of the invention, the shaft can always be pushed into the exact axial assembly position in a simple way, since, in this first step for making the assembled connection, there is full play between the shaft and hub and no jamming or even pressing occurs when the shaft is being pushed through. As an accompaniment, any damage to the toothings which is associated with this is also avoided. Narrow manufacturing tolerances of the toothings of the shaft and hub and of their axial and circumferential dimensions no longer play any part in the reliability of the production process, so that, on the one hand, cost-effective materials, even without any heat treatment, and simple production methods can be used for the hub and the shaft and, on the other hand, the particularly considerable outlay in terms of apparatus and time for fulfilling required narrow manufacturing tolerances in the assembled connection may be dispensed with. Thus, overall, the reproducibility of the assembled connection is fully ensured. Furthermore, by a hollow shaft being used specifically for the method, there is a weight saving in the assembled connection and therefore material resources are utilized more effectively. As a result of the circumferential pressure against the hub due to the widening of the hollow shaft, high non-positive and positive locking between shaft and hub is achieved, which is fully compatible with the dynamic loads. That is to say, no fit clearance occurs during the dynamic load, and there is also no increase in the clearance, and therefore direct torque transmission, without any time delay, is ensured. The fit clearance is prevented by the non-positive component of the connection on account of the elastic reformation of the hub. In addition, as a result of this non-positive or frictional component, a high resistance force against axial displacement of the hub on the shaft after assembly is generated. Moreover, a high long-term durability of the assembled connection is achieved, since the toothing is not shaken during the operating time. The disturbing rattling noises associated with fit clearance when the teeth knock against one another also do not arise. Process management during assembly is also simplified, the shaft/hub connection requiring only two work steps, to be precise the pushing of the shaft into the hub and the widening of the shaft.

Expedient refinements of the invention may be gathered from certain claims; moreover, the invention is explained in more detail below by means of an exemplary embodiment illustrated in the drawings.

BRIEF DESCRIPTION OF THE DRAWINGS

FIG. 1 shows a side view of a shaft/hub connection according to the invention,

FIG. 2 shows, in cross section, the connection from FIG. 1 in the push-in position of the shaft, FIG. 3 shows an enlarged detail of the connection from FIG. 2, FIG. 4 shows, in cross section, the connection from FIG. 1 after the widening of the shaft, FIG. 5 shows an enlarged cross section of the connection from FIG. 4.

DETAILED DESCRIPTION OF THE INVENTION

Figure 6:
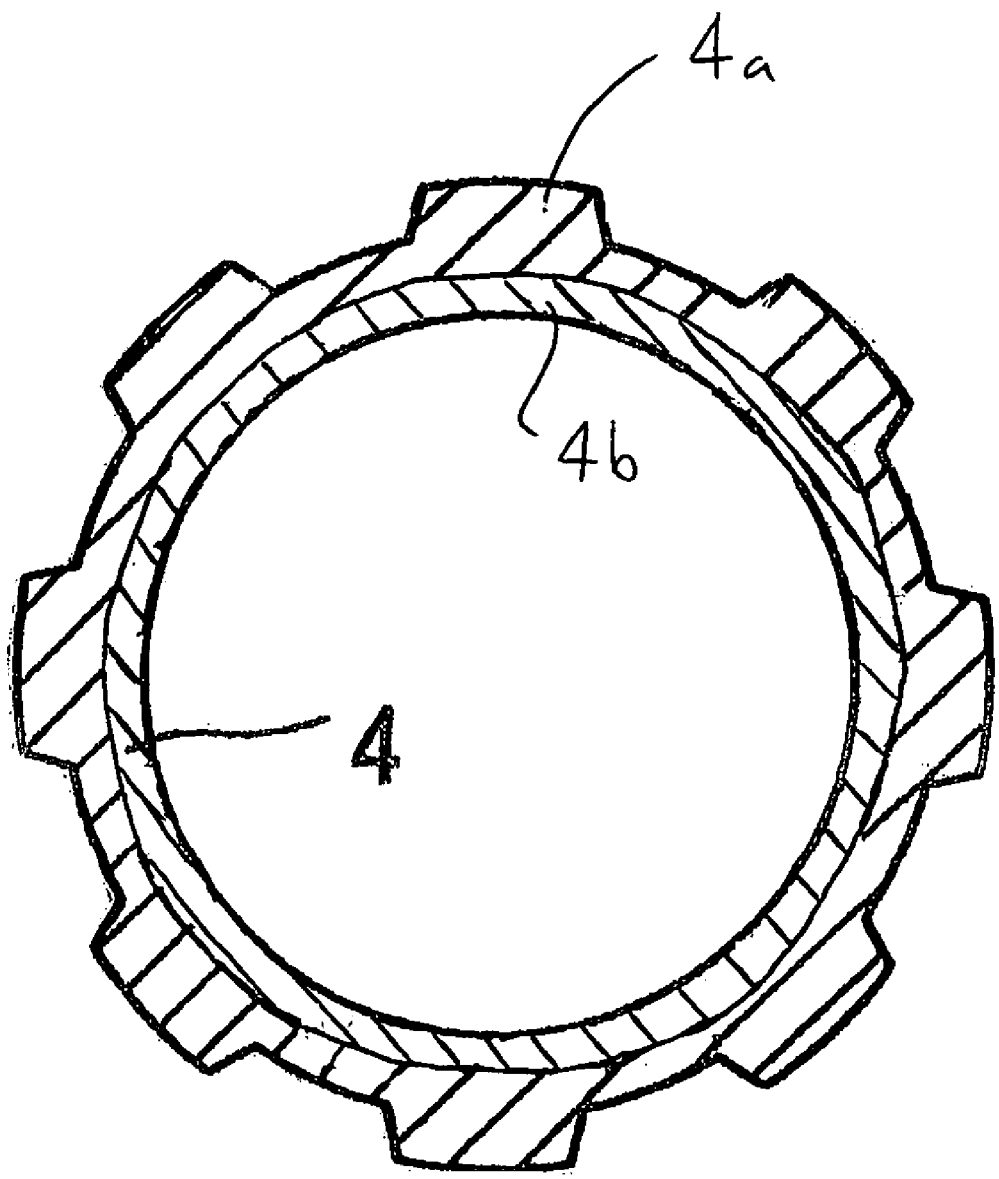
FIG. 6 shows a modified shaft construction.

FIG. 1 illustrates a shaft/hub connection 1, in which an end portion 3 of a hollow shaft 4, the end portion being provided with an external toothing 2, projects through a hub 5. The hollow shaft 4 may be designed as a toothed shaft or, as here in the exemplary embodiment, as a splined shaft. The splined shaft can be produced in a simple way, for example, by drawing a tube or by milling that portion 3 of the hollow shaft 4 which is intended for the formation of the toothing. The corresponding internal toothing 6 of the hub 5 can be generated by reaming or else by milling. Referring to FIG. 6, is also conceivable for the hollow shaft 4 to be formed from two separate structural parts, a toothed rim 4a and a smooth-cylindrical tube 4b, the toothed rim 4a which forms the external toothing 2 of the hollow shaft 4 being pushed onto the tube into the desired axial assembly position and subsequently being fastened unreleasably to the tube, for example, by welding or by a partial widening of the tube brought about by means of a fluidic internal high pressure applied in the tube. The teeth 7 and the spaces 8 of the external toothing 2 of the hollow shaft 4 of a conventional tube material have a prismatic design. The internal toothing 6 of the hub 5 is configured correspondingly. The splined shaft 4 is then pushed with clearance, with its external toothing 2, into the internal toothing 6 of the hub 5, tooth to space, an assembly gap 9 being formed between the toothings 2 and 6 (FIG. 2 and, in particular, FIG. 3).

After the exact axial relative position between the hollow shaft 4 and the hub 5 is reached, what may be referred to as a widening lance is pushed into the inner space 10, forming the cavity, of the hollow shaft 4. An axial duct for carrying a fluidic medium which is under high pressure runs in the widening lance, the duct possessing a radial bore which is positioned at the location of the widening to be produced. The radial bore is sealed off, resistant to high pressure (>approximately 500 bar), in both axial directions by means of two radial seals arranged on the circumference of the widening lance on both sides of the bore outlet. That is to say, only that location of the hollow shaft 4 which lies between the two radial seals is acted upon by the internal high pressure, and, therefore, the hollow shaft 4 is partially deformed. By the fluid high pressure being controlled, the sequence of the widening process and the pressure force and therefore the strength of the frictional lock can be set in a highly accurate way, as required, though, of course, within the framework of the breaking elongation of the hollow-shaft material and the deformation elasticity of the hub 5.

The hollow shaft 4 is thus circumferentially widened plastically in the radial direction, until the external toothing 2 comes into firm circumferential bearing contact against the internal toothing 6 of the hub 5, with the fit clearance still existing up until then being cancelled (FIGS. 4 and 5). When the frictional and positive locking of the hollow shaft 4 and hub 5 is achieved as a result, there remains at most only a radial gap 11 between the toothed tips 12 of the teeth 7 of the external toothing 2 of the hollow shaft 4 and the respective facing space bottom 13 of the spaces of the internal toothing 6 of the hub 5, as may be seen particularly in FIG. 5. The hub 5, admittedly, also widens momentarily, but only in the elastic range, so that, after the pressure is relieved, the hub material springs back elastically towards the plastically widened hollow shaft 4, thus affording particularly high frictional locking between the shaft 4 and the hub 5.

There are, locally, several possibilities for widening. On the one hand, widening, and correspondingly, pressing may take place locally only at particular points, for which purpose the hollow shaft 4 having the external toothing 2 is pressed continuously onto the internal toothing 6 of the hub 5 at at least one axial position within the extent of the hub, thus making production, particularly in the case of a widening method, applied to the hollow shaft 4, particularly rapid.

On the other hand, the shaft 4 may be widened in its axial extent locally and selectively at the location of the hub 5 along the entire axial overlap region of the toothings 2 and 6. In this case, the non-slip hold of the hub 5 on the hollow shaft 4 is advantageous in terms of the fatigue strength of the hold, since the torques acting on the shaft/hub connection can be distributed broadly over the overlap region. Moreover, even relatively high torques can be transmitted without damage.

Furthermore, it is conceivable for the hub 5 and the shaft 4 to be assembled in the push-in position in a closed internal high-pressure forming die. In this case, not only that portion 14 of the hollow shaft 4 which lies in the overlap region of the toothings 2 and 6 at the location of the press fit to be made can be widened, but also the portions 15 lying outside the overlap region. The hollow shaft 4 may in this case be widened over its entire extent. This results, for the hub 5, in an axially positive embedding into the hollow shaft 4 and, consequently, in an immovable axial hold. If the widening is restricted only to the overlap region, a shaft/hub connection or a production of the assembly which saves construction space, as compared with the last-mentioned variant, can be achieved. A closed internal high-pressure forming die is not necessary for this purpose, so that the use of the abovementioned widening lance is sufficient.

After the desired shaft/hub connection is made, in the case of action by internal high pressure the latter is relieved and the widening lance is drawn out of the hollow shaft 4. By the regulation of the internal high pressure being capable of being controlled in a highly accurate manner, the widening operation can be coordinated exactly with the respective wall thickness of the hollow shaft 4 and/or with the breaking elongation of the hollow-shaft material in a careful and advantageous way by means of a single die, so that process reliability is further improved.

Alternatively to widening by means of fluidic internal high pressure, this may also be carried out by drifting or reaming. The shaft/hub connection according to the invention may be used, for example, in gearwheel, chain and belt mechanisms in the drive train of motor vehicles.

The invention claimed is:

1. A method for making a shaft/hub connection comprising:
   providing a toothed or splined shaft having external prismatic teeth and a hub having internal teeth and prismatic spaces between the internal teeth,
   pushing the external teeth with clearance into the spaces, tooth to space,
   plastically deforming the shaft in a push-in position of the shaft by way of a cavity of the shaft in a radial circumferential widening operation and elastically deforming the hub, without plastically deforming the hub, so as to produce firm circumferential bearing contact between lateral faces of the external teeth and the internal teeth and so that the external teeth engaging into the spaces produce frictional and positive locking between the shaft and the hub, and
   maintaining a radial gap between tips of the external teeth and respective surfaces, facing the tips, of the spaces.

2. The method according to claim 1, wherein the shaft is widened in an axial extent locally and selectively at a location of the hub.

3. The method according to claim 1, wherein the shaft is widened over its entire extent.

4. The method according to claim 1, wherein the shaft is widened by means of fluidic internal high pressure.

5. The method according to claim 1, wherein the shaft is hollow and is manufactured from a toothed rim and a smooth-cylindrical tube which define two separate structural parts, and wherein the toothed rim forms the external teeth and is pushed onto the tube in the correct position and then fastened by welding or by a widening of the tube brought about by a fluidic internal high pressure applied in the tube at the location of the toothed rim.

6. The method according to claim 2, wherein the shaft is widened by means of fluidic internal high pressure.

7. The method according to claim 3, wherein the shaft is widened by means of fluidic internal high pressure.

8. The method according to claim 2, wherein the shaft is hollow and is manufactured from a toothed rim and a smooth-cylindrical tube which define two separate instrumental parts, and wherein the toothed rim forms the external teeth and is pushed onto the tube in the correct position and then fastened by welding or by a widening of the tube brought about by a fluidic internal high pressure applied in the tube at the location of the toothed rim.

9. The method according to claim 3, wherein the shaft is hollow and is manufactured from a toothed rim and a smooth-cylindrical tube which define two separate instrumental parts, and wherein the toothed rim forms the external teeth and is pushed onto the tube in the correct position and then fastened by welding or by a widening of the tube brought about by a fluidic internal high pressure applied in the tube at the location of the toothed rim.

10. The method according to claim 4, wherein the shaft is hollow and is manufactured from a toothed rim and a smooth-cylindrical tube which define two separate instrumental parts, and wherein the toothed rim forms the external teeth and is pushed onto the tube in the correct position and then fastened by welding or by a widening of the tube brought about by a fluidic internal high pressure applied in the tube at the location of the toothed rim.

11. The method according to claim 6, wherein the shaft is hollow and is manufactured from a toothed rim and a smooth-cylindrical tube which define two separate instrumental parts, and wherein the toothed rim forms the external teeth and is pushed onto the tube in the correct position and then fastened by welding or by a widening of the tube brought about by a fluidic internal high pressure applied in the tube at the location of the toothed rim.

12. The method according to claim 7, wherein the shaft is hollow and is manufactured from a toothed rim and a smooth-cylindrical tube which define two separate instrumental parts, and wherein the toothed rim forms the external teeth and is pushed onto the tube in the correct position and then fastened by welding or by a widening of the tube brought about by a fluidic internal high pressure applied in the tube at the location of the toothed rim.

* * * * *